Aug. 21, 1934.  W. F. LAUTENSCHLAGER  1,971,143
MACHINE FOR MAKING A KNOTTED STITCH
Filed Dec. 5, 1931  10 Sheets-Sheet 1

Inventor
William F. Lautenschlager
by Francis N. Dakin
Atty.

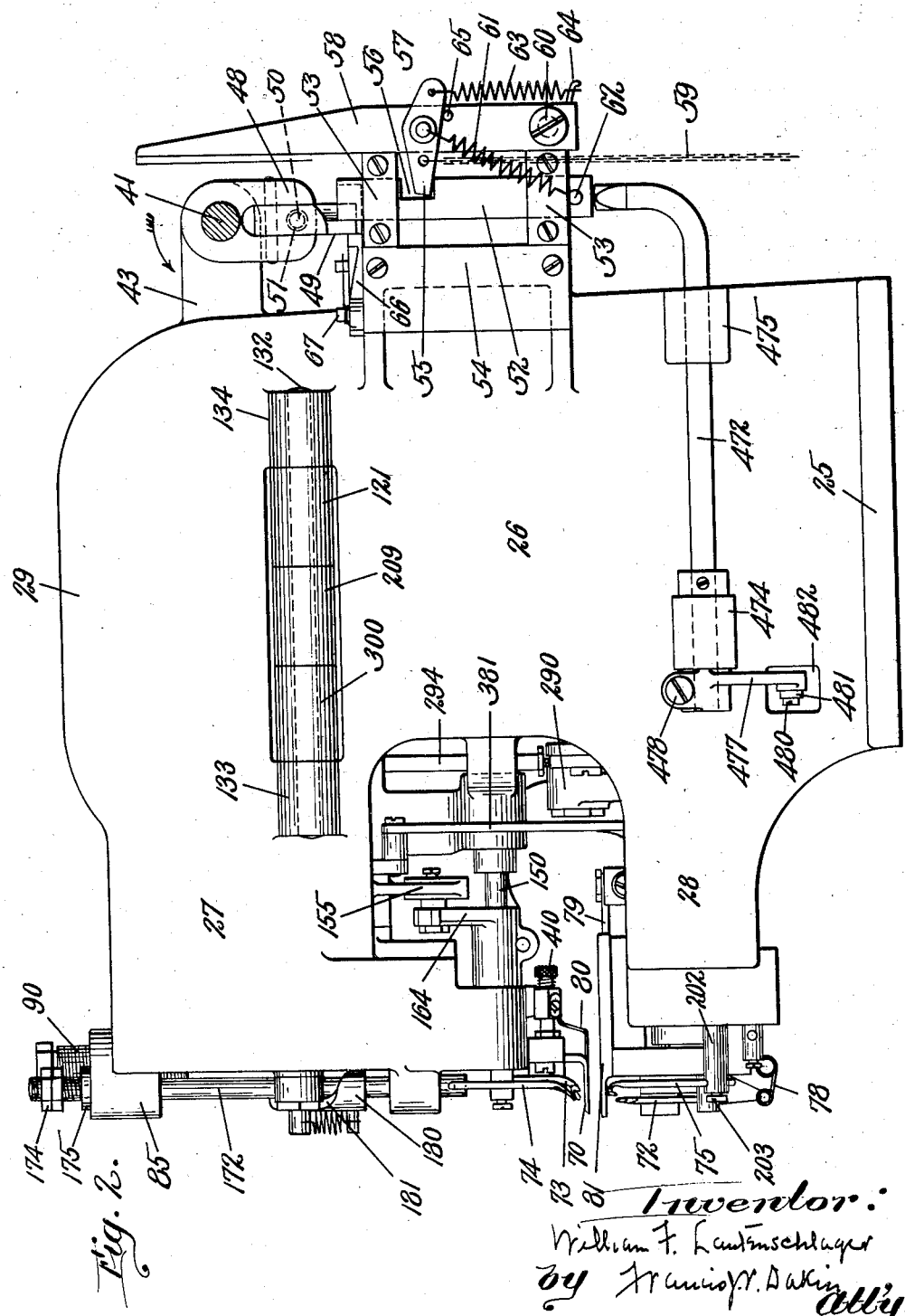

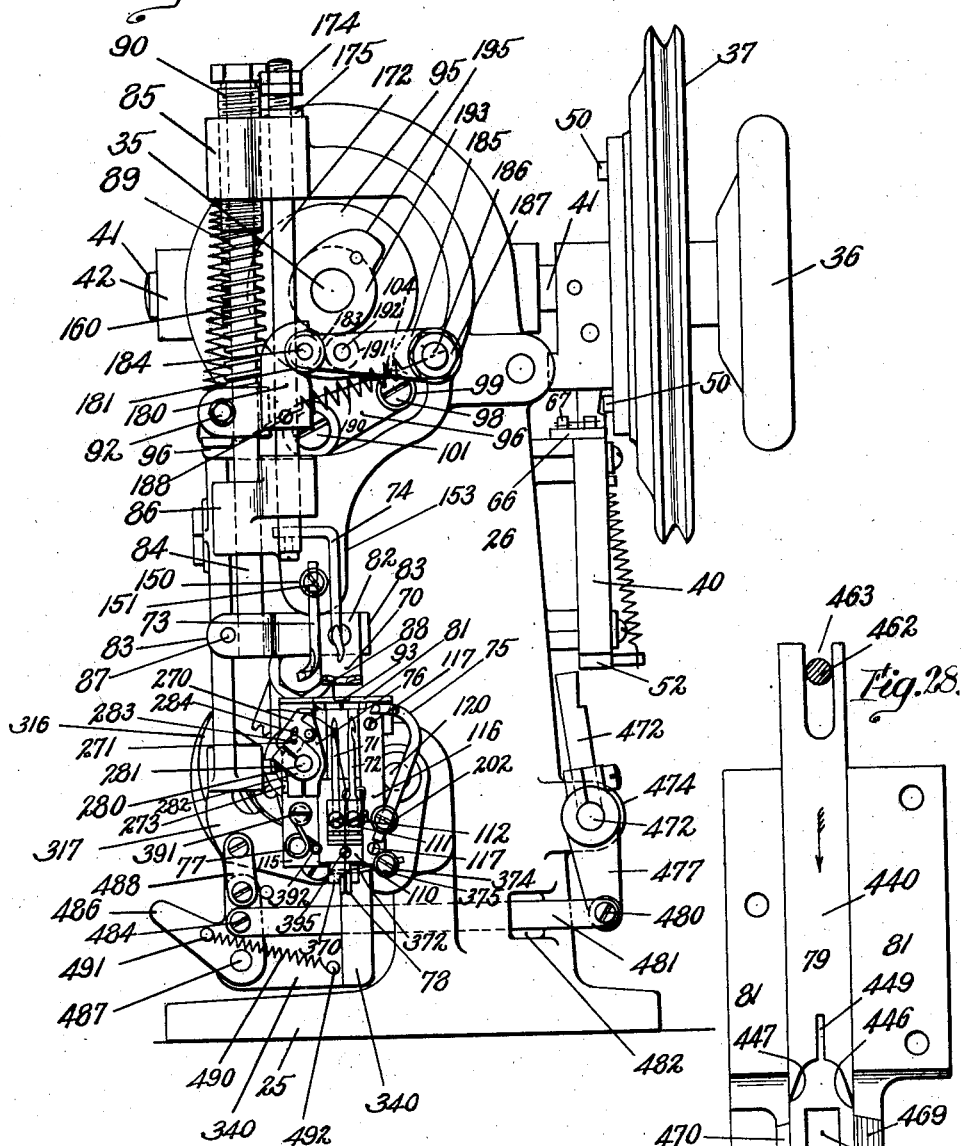

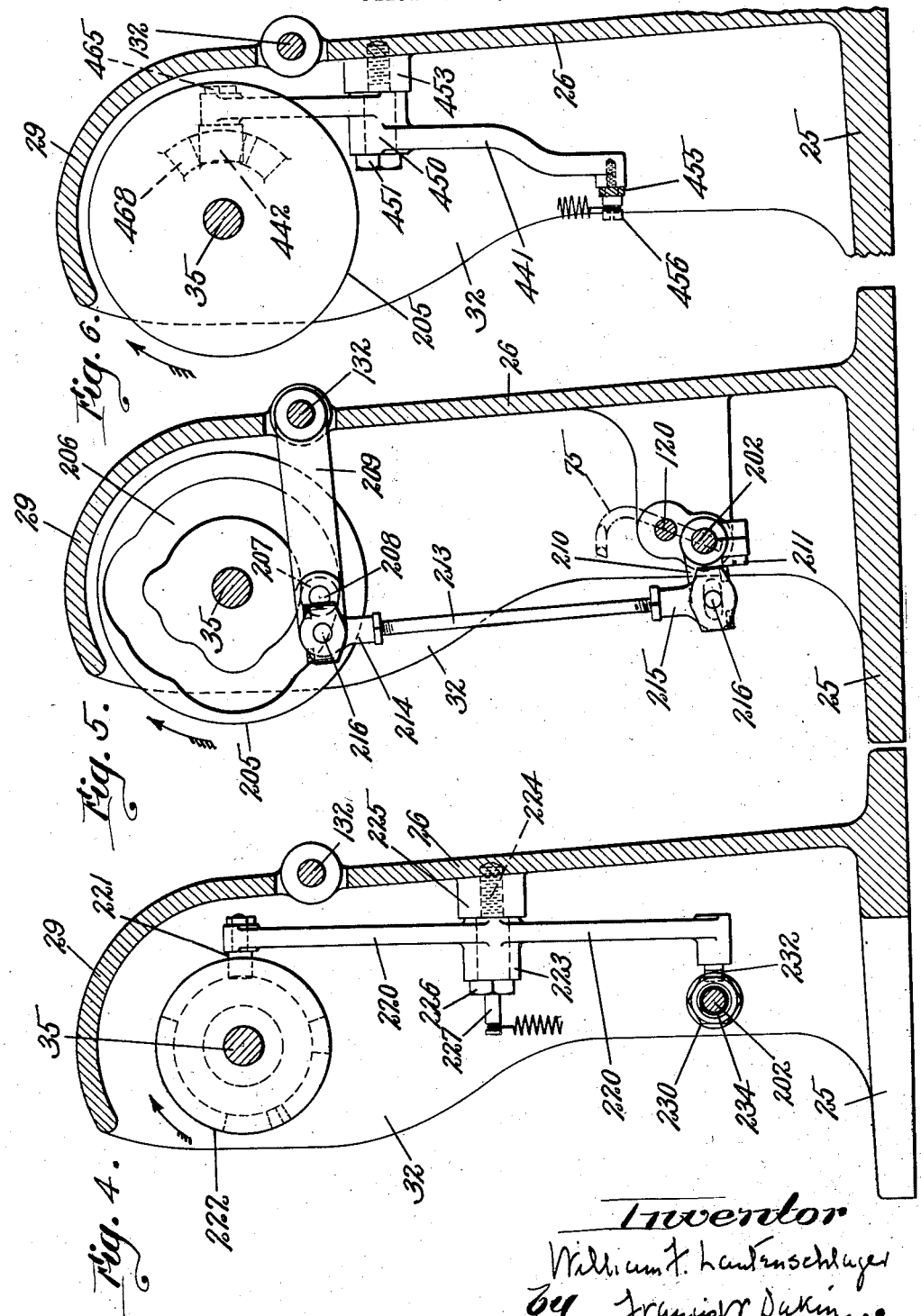

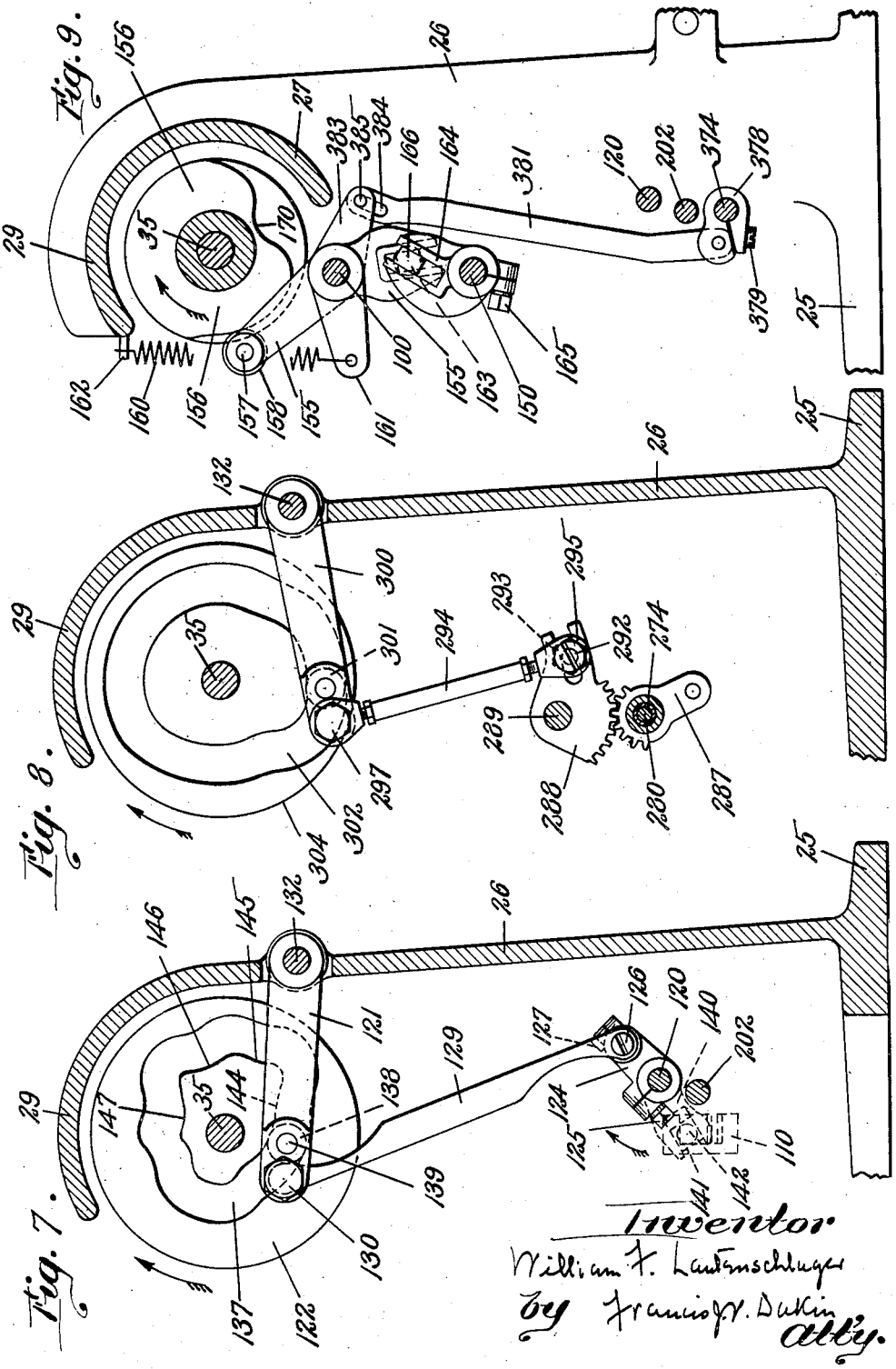

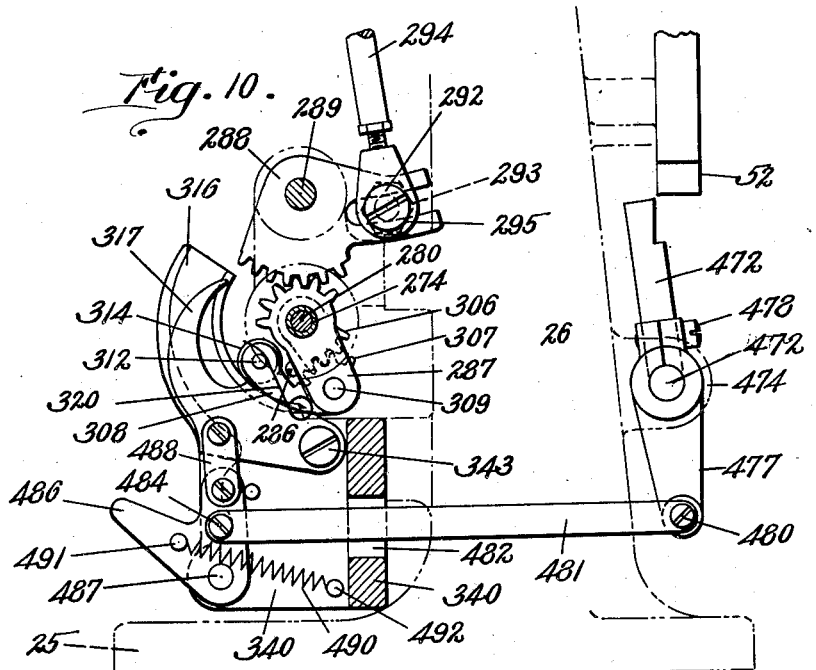
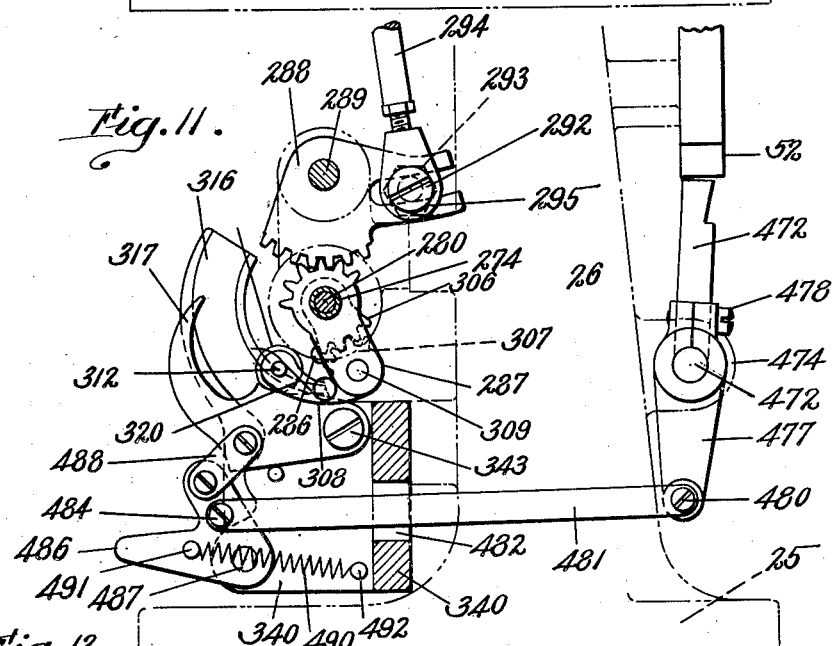
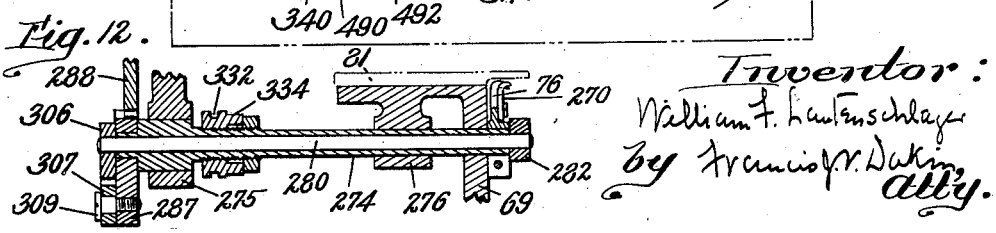

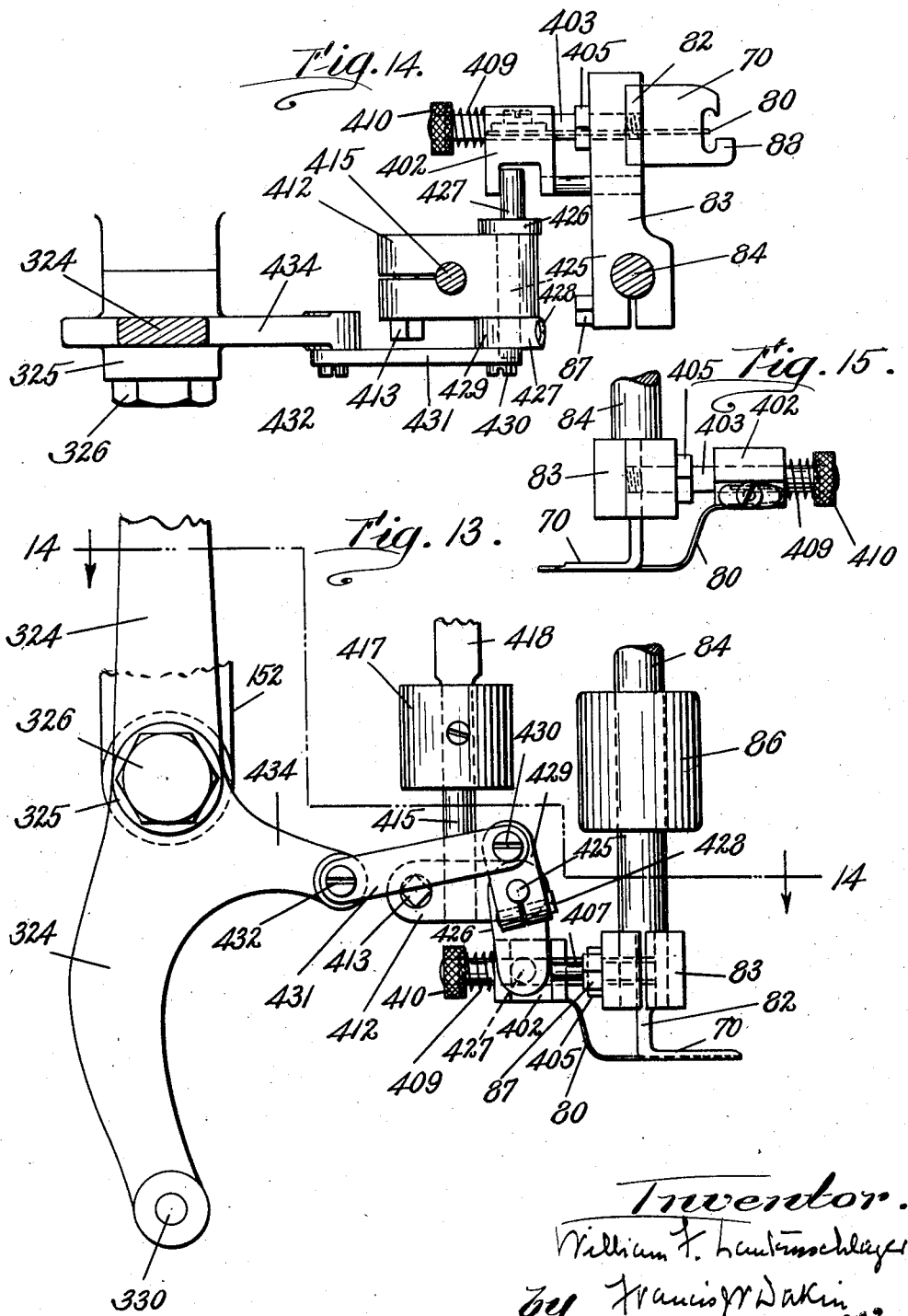

Aug. 21, 1934.  W. F. LAUTENSCHLAGER  1,971,143
MACHINE FOR MAKING A KNOTTED STITCH
Filed Dec. 5, 1931  10 Sheets-Sheet 8
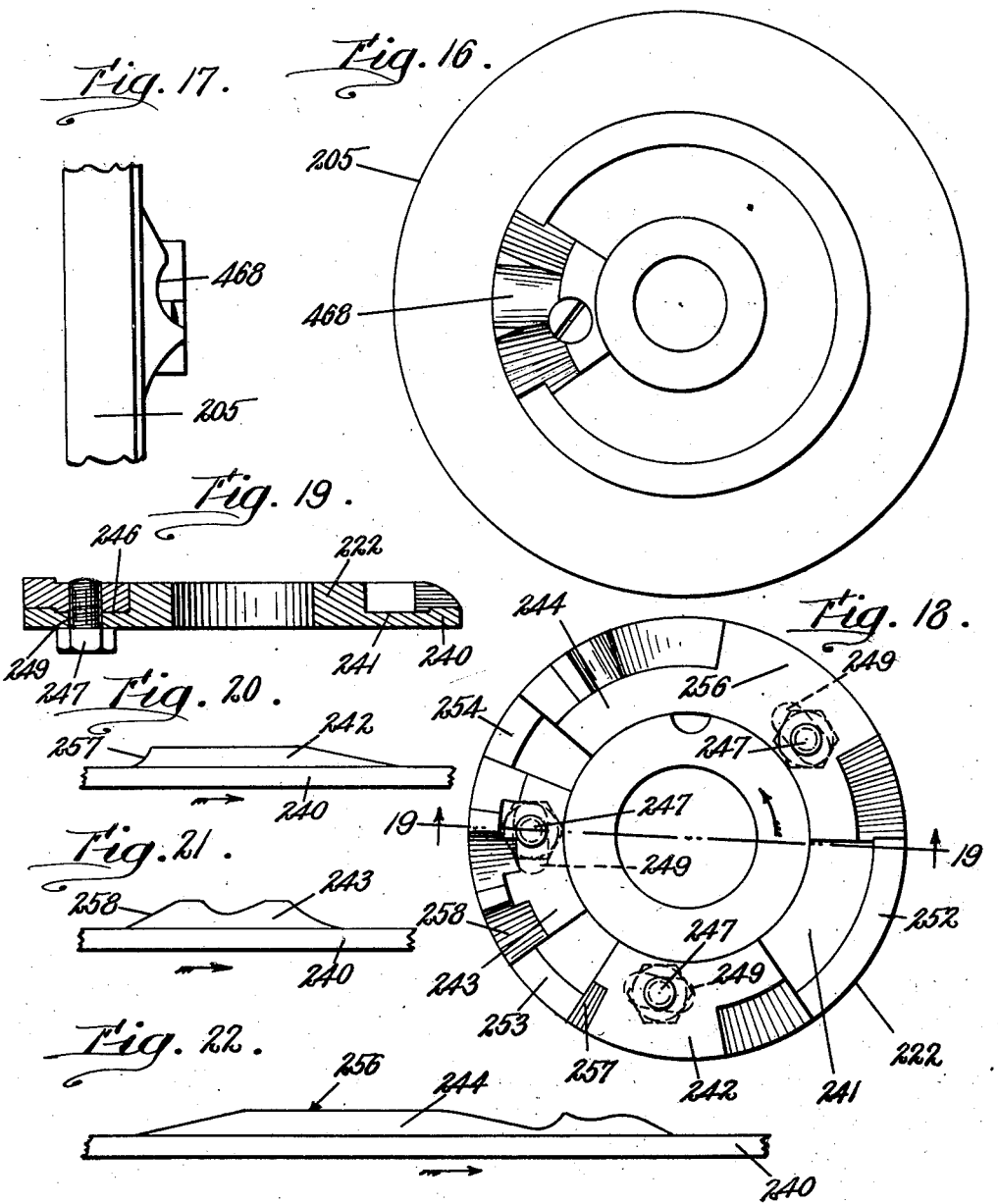

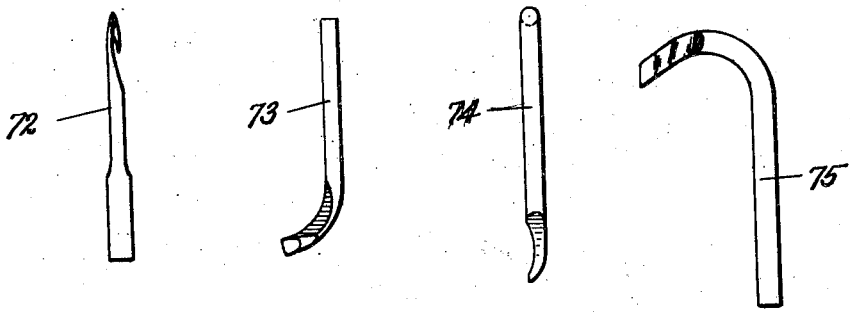
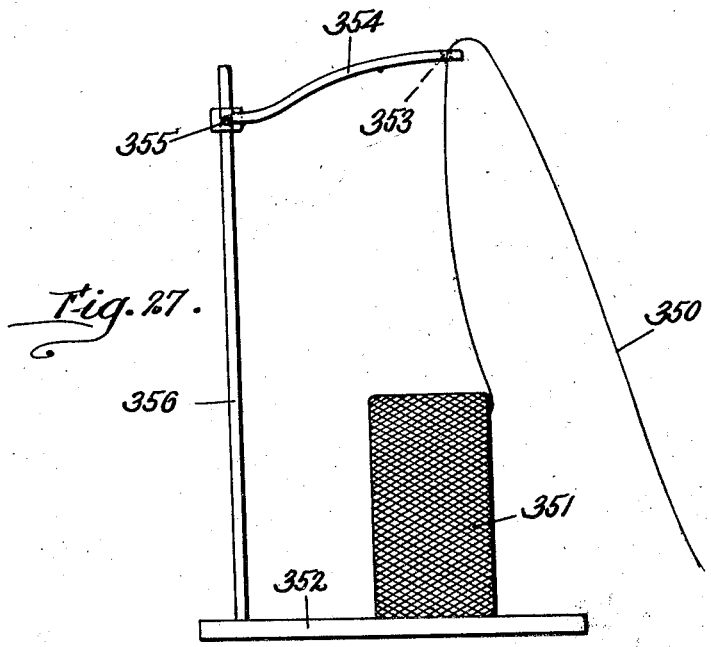

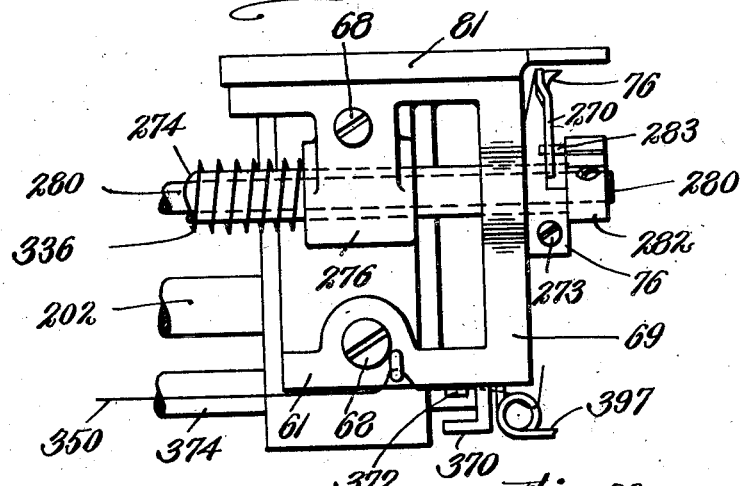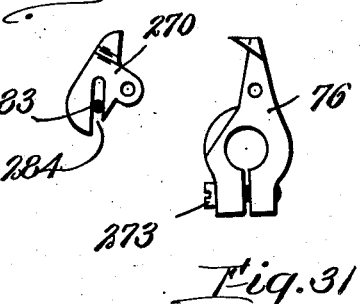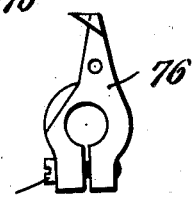

Patented Aug. 21, 1934

1,971,143

UNITED STATES PATENT OFFICE 1,971,143

MACHINE FOR MAKING A KNOTTED STITCH

William F. Lautenschlager, Cincinnati, Ohio, assignor to Peerless Machinery Company, Boston, Mass., a corporation of Massachusetts Application December 5, 1931, Serial No. 579,218

23 Claims. (Cl. 112—156)

My invention relates to a machine for making a knotted stitch in accordance with the method shown and described in Letters Patent of the United States No. 1,284,911, issued to me November 12, 1918 and is an improvement on the machine shown and described in United States Letters Patent No. 1,652,946, issued to me December 13, 1927.

The method described in said Patent No. 1,284,911 consists essentially in passing a primary loop of thread comprising a pair of stretches in reverse direction through the material, then passing one of the stretches of said thread through the bight portion of said primary stretch as a supplemental loop, drawing upon said stretch forming said supplemental loop for drawing up said primary loop whereby its bight is drawn across the stretches of said supplemental loop, passing the other of the first named stretches of said thread through said supplemental loop and then drawing upon the outer stretch of said supplemental loop for drawing its bight upon said other of said first named stretches of said thread to tighten and complete the knot.

Briefly my invention contemplates a machine having a suitable throat-plate to hold the material in which the knotted stitch is to be formed, with two upright needles, one an eye needle and the other a hook needle, mounted on a suitable reciprocating carrier below the throat-plate. The thread is passed through the eye needle, the free end being held by a gripper, and between the needle and the source of supply are arranged a suitable take-up and other devices for maintaining a tension on the supply thread and for holding and releasing it at appropriate times. After the eye needle has been threaded, the starting of the machine causes the two needles to be moved upwardly through the throat-plate and the material, the eye needle carrying the thread through the material. After reaching the end of the upward movement, the needles dip thereby causing a loop to be formed in the thread on the eye needle and thereupon a pivoted looper swings into the loop and carries the latter behind the hooked needle. A take-off looper then drops down and swinging in a circular path toward the eye needle, catches the upper portion of the loop, drops it off the looper and carries that portion around the hooked needle. The hooked needle then drops, pulling the loop downwardly through the work to tighten the thread in the work which forms a primary loop below the work. The primary loop thus formed below the work is opened up by a slight raising of the needles whereupon a pivoted lower looper, arranged beneath the work support, is moved forwardly through the primary loop and against the supply stretch of thread, catches the latter in its hooked nose and carries it back through the primary loop thereby forming a supplemental loop. After the lower looper has pulled the supplemental loop through the primary loop, the gripper is turned to exert a pull on the end of the other stretch of thread held by it in order to draw up the primary loop and to tighten its bight over the stretches of the supplemental loop. While the primary loop is being drawn taut by the gripper, the lower looper remains quiescent with the supplemental loop still held in its hooked nose, but as soon as said tightening operation is completed, the said looper again moves forwardly, the supplemental loop moving rearwardly on the looper into the neck portion thereof and on this second forward movement, the looper engages and carries the end of the thread held by the gripper. The lower looper then moves back carrying the gripper thread with it and the gripper after moving with the thread a slight distance releases it and the looper carries it through the supplemental loop and beyond to a point where the thread binds between the upper surface of the looper and the bottom face of the throat-plate. While the end of the thread is so held, the gripper has moved forward and seized the supply stretch of the thread which also forms one stretch of the supplemental loop and then the gripper moves back pulling on the supply stretch and drawing the supplemental loop taut to bind the free end of the thread held between the looper and the work plate whereby the knot is tightened and completed. A cutting mechanism is then operated to cut the threads whereupon the work may be removed from the machine with the knotted stitch completed.

My invention contemplates a machine having certain operating instrumentalities such as a pair of needles, one an eye and the other a hooked needle, an upper looper, a take-off looper, and a lower looper, a gripper and take-up, a tightening and suitable tension holding and releasing devices for the thread, all designed to form the knotted stitch, on the one hand, and certain actuating mechanisms for giving the operating parts their appropriate movements, on the other hand.

The main object of the present invention is the provision of a machine of the general character shown in my prior machine patent, in which the operating instrumentalities and the actuating mechanisms have been simplified and made more positive and efficient in operation.

Another object of the present invention is the provision of a new form of hooked needle in which the point of the barb is bent inwardly to avoid damaging the work by breaking the strands of light silk and similar fabrics and especially fabrics which are knitted.

Another object of the invention is the provision of means for transferring the primary loop from the upper looper into the hook of the hooked needle to remove any possibility of the loop becoming disengaged from that needle when it starts to descend.

Yet another object of the invention is the provision of a lower looper having a restricted neck portion formed to retard the disengagement of the supplemental loop from the looper on its rearward movement long enough to permit one of the stretches of the thread to be drawn therethrough at the proper time in the forming of the knot.

Another object of the invention is the provision of gripper actuating mechanism of simple construction which can be easily and quickly adjusted.

An additional object of the invention is the provision of taking up and tightening means of simple yet efficient construction capable of rapid adjustment to take care of variations of conditions of work.

Another object of the invention is the provision of means adapted to be projected between the work and work support during the initial steps of the method of forming the knot to prevent the work being drawn downwardly by the action of the needles in the tightening of the primary loop.

Another object of the invention is the provision of means for severing the threads close to the work upon the completion of the knot.

Another object is the provision of a control cam having adjustable cam surfaces which may be adjusted to secure the final refinements in the timing of the operative members.

A further object is the provision of simple and efficient thread straightening means for removing the kinks in the thread due to the spool windings in order to present the thread to the operating instrumentalities in a straight untwisted condition.

Other objects of the invention will be more specifically set forth and described hereinafter.

In the accompanying drawings, Figure 1 is an elevation of the open side of a machine constructed in accordance with my invention with the front or operating end of the machine on the right;

Fig. 2 is an elevation of the other side of the machine;

Fig. 3 is a front end elevation of the machine as viewed from the operator's seat;

Fig. 4 is a vertical sectional view on line 4—4 in Figure 1 looking from right to left showing the cam mechanism for imparting longitudinal movement to the lower looper shaft and lateral movement to the lower looper;

Fig. 5 is a vertical sectional view on line 5—5 in Fig. 1, looking from right to left, showing the cam mechanism for imparting forward and backward movement to the lower looper;

Fig. 6 is a vertical sectional view on line 6—6 in Fig. 1, looking from right to left, showing the cam mechanism for operating the cutting mechanism;

Fig. 7 is a vertical sectional view on line 7—7 in Fig. 1, looking from right to left, of the cam mechanism for reciprocating the needle carrier vertically;

Fig. 8 is a vertical sectional view on line 8—8, looking from right to left, in Fig. 1 of the cam mechanism for operating the gripper;

Fig. 9 is a vertical sectional view on line 9—9 in Fig. 1 of the cam mechanism for operating the upper looper and the thread holding mechanism;

Fig. 10 is a vertical sectional view showing in elevation the gripper operating mechanism in position for closing the jaws of the gripper, said gripper mechanism being connected to the safety device on the clutch which is shown in position to permit the machine to be operated;

Fig. 11 is a similar view showing the position of the actuating mechanism when the jaws of the gripper are open and showing also the safety device for locking the clutch mechanism in operative position;

Fig. 12 is a vertical longitudinal sectional view of the gripper and actuating mechanism;

Fig. 13 is a side elevation of the mechanism for drawing the work supporting member into and out of operative position;

Fig. 14 is a plan view of the same looking downwardly on line 14—14 in Fig. 13;

Fig. 15 is a side elevation of the presser foot with the supporting member in retracted position;

Fig. 16 is a side elevation of the rear face of the cam for rocking the lower looper shaft, which rear face is provided with cam surfaces for operating the cutting mechanism to sever the threads after the knotted stitch has been completed;

Fig. 17 is a side elevation of that portion of the cam containing the cutting mechanism operating cam surfaces looking from left to right in Fig. 16;

Fig. 18 is an elevation of the rear or operating face of the adjustable cam for imparting longitudinal movement to the lower looper shaft;

Fig. 19 is a cross sectional view of said cam on line 19—19 in Fig. 18;

Fig. 20 is a developed diagrammatic side elevation of one of the adjustable cam members shown in Fig. 18;

Fig. 21 is a similar view of another of said adjustable cam members;

Fig. 22 is a similar view of the third of said members;

Figs. 23, 24, 25 and 26 are side elevations on an enlarged scale as viewed from the operator's seat of the hook needle, upper looper, take-off looper and lower looper respectively;

Fig. 27 is a side elevation of thread holding device;

Figure 1:
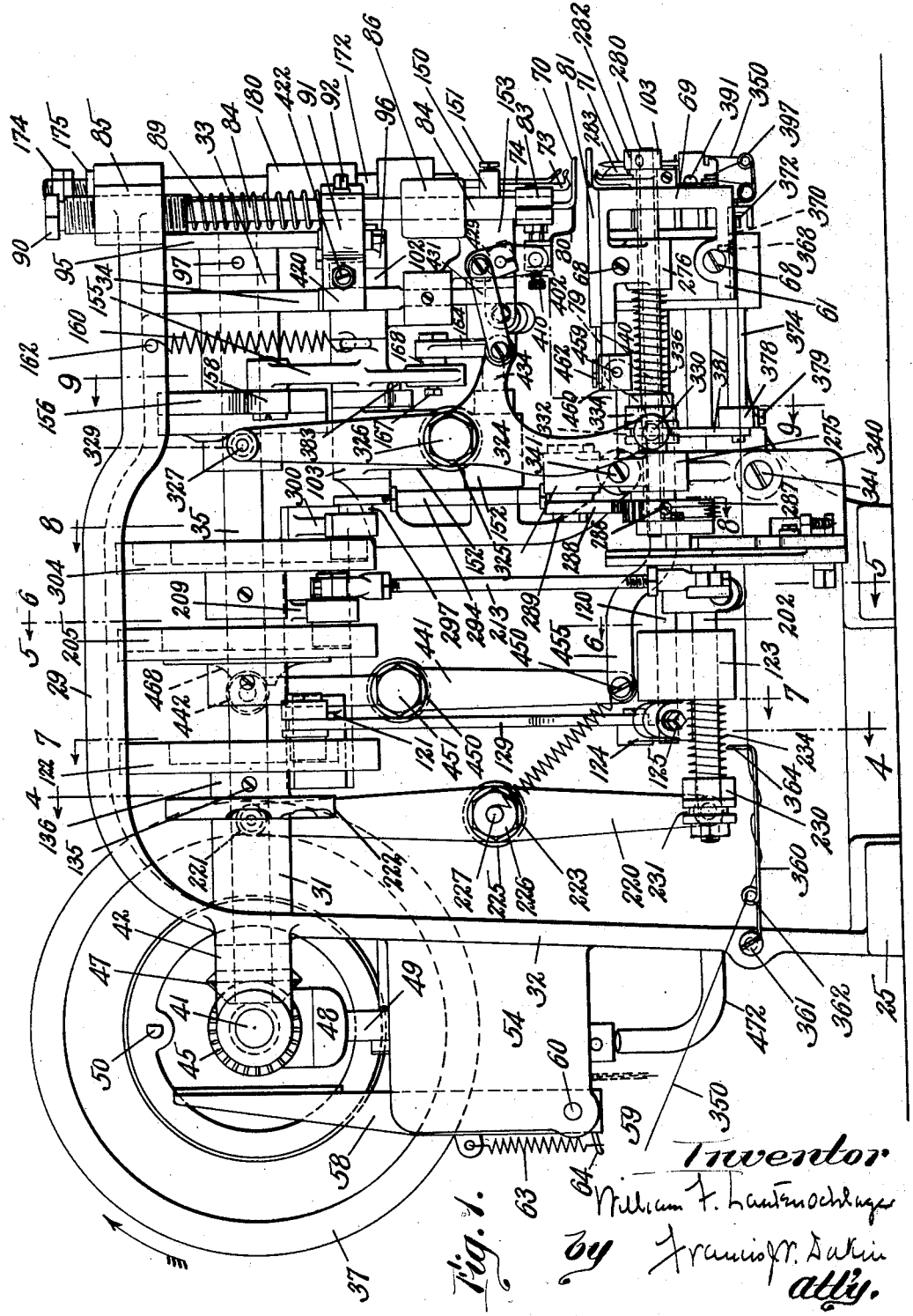

Fig. 28 is a bottom plan view of the work support and cutting member; Fig. 29 is a side elevation on an enlarged scale of the work support end of the lower arm; Fig. 30 is an end elevation looking from right to left in Fig. 29; Fig. 31 is a detailed view of the fixed jaw of the gripping mechanism; Fig. 32 is a detailed view of the movable jaw; and Fig. 33 is a sectional view on line 33—33 in Fig. 30.

Referring to the drawings, the frame of the machine is shown as a one-piece casting comprising a base 25, horseshoe in plan, from the head portion of which springs upwardly a main body portion 26, somewhat U-shaped in cross section, which is extended on one side above and below to form an upper arm 27 and a lower arm 28. The top of the body portion and upper arm is curved over to form a hood 29 for partially enclosing the mechanisms within the frame but leaving one side of the machine and all the mechanisms therein open to view. Various extensions and brackets, hereinafter described, are formed integral with the frame for supporting certain parts of the various mechanisms. The frame may, however, be of any suitable form.

Mounted in an inwardly extending hub bearing 31 formed on the rear part 32 of the frame and in a hub bearing 33 supported by a web 34 in the upper arm 27 is a main shaft 35 (Fig. 1) which may be provided with a hand wheel 36 for turning the machine over by hand and an idler belt pulley 37 adapted to be connected to the main shaft by a suitable clutch for driving the machine by power (Fig. 3). Since the illustrated machine is so designed that the operator sits facing the front end of the machine, it is more convenient to have the hand wheel and pulley located at the rear end of the machine on one side thereof and for that purpose a cross shaft 41 is rotatably mounted in suitable bearings in two rearwardly extending arms 42 and 43 constituting a part of the frame for driving the main shaft by means of a mitered gear 45 on the cross shaft which meshes with a similar gear 47 fixed on the rear end of the main shaft (Fig. 1). The hand wheel and pulley are mounted on the outer end of the cross shaft. Any suitable clutch may be employed for connecting the idler pulley to the cross shaft to drive the main shaft, and one form is shown comprising a housing 48 (Fig. 2) fastened to the cross shaft for carrying a clutch pin 49 adapted to engage projecting lugs 50 on the inner face of the idler wheel when the pin is pressed outwardly by a spring 51. For holding the clutch normally out, a vertically movable locking bar 52 is mounted in lateral extensions 53 formed on a plate extension 54 of the frame and is provided with a bevelled face to engage the bevelled face of the clutch pin 49 to hold it in inward position. For pulling the locking bar downwardly to throw in the clutch, an arm 55 having its nose entering a recess 56 in the bar, is pivotally mounted on a pin 57 in an upright bar 58 and a chain 59 connects the arm 55 to a foot-treadle (not shown). The bar 58 is pivotally mounted at its lower end on a screw pin 60 set in the lower extension 53 and a spring 61 connected to the pin 57 and to a stop pin 62 in the locking bar holds the latter in upward locking position and holds the bar 58 inwardly against the upper extension 53. A second spring 63, connected to the outer end of arm 55 and to a pin 64, holds that arm against a stop 65 with its nose in proper position in the recess 56. A spring pressed block 66 pivotally mounted on a pin 67 on top of the upper extension 53 is adapted to be thrown in back of the clutch pin to prevent back lash at the end of each revolution.

Attached to one side of the forward end of the lower arm 28 by screws 68 is a rectangular housing 69, to the upper face of which is fastened a forwardly extending work-supporting plate 81 having a needle recess or opening 93 in its forward edge.

The operating instrumentalities include a presser-foot 70 for holding the work, a supporting member 80, an eye needle 71, a hooked needle 72, an upper looper 73, a take-off looper 74, a lower looper 75, a gripper 76, a take-up 77, a tightening device 78 and a cutter 79. The presser-foot, supporting member, upper looper and take-off looper are mounted upon the upper arm and all the other of said parts are on the lower arm. All of these parts are given their appropriate movements at the desired times by means of various connections operated from a plurality of cams mounted on the main shaft. Since each of these operating instrumentalities has its own particular actuating mechanism, operated from the main shaft, it will conduce to clearness in the following description to describe each of these instrumentalities with its particular actuating mechanism under a sub-head. It is also believed that such an arrangement will permit of convenient reference for a description of any particular mechanism.

The presser foot

The presser foot 70 is provided with an upright plate shank portion 82 fitted into a rectangular recess in a laterally extending arm 83 fastened to the lower end of a presser foot bar 84 slidably mounted in bearings 85 and 86 formed on the end of the upper arm 27. The outer end of the arm 83 is bored to receive the end of the presser foot bar and is then split vertically to form ears which are drawn together by a screw 87 to clamp the arm tightly about the bar. The presser foot has a nose 88 which extends forwardly and inwardly to hold down the work around the needle space.

For exerting a resilient downward pressure on the presser foot permitting that member to yield slightly, a helical spring 89 is mounted on the presser foot bar abutting at its upper end an adjusting screw 90 and at its lower end a block 91 clamped to the bar. The adjusting screw is threaded through the bearing 85 and is hollow to receive the upper end of the presser foot bar and the pressure of the spring may be regulated by the manipulation of the adjusting screw. The block 91 is bored vertically and split laterally to form an ear which is drawn tightly about the bar by a screw 92.

For raising the presser foot bar against the compression of the spring 89, a circular cam 95 cooperates with a cam lever 96, one end of which engages the bottom face of the block 91 (Fig. 3). The cam is fastened to the forward end of the main shaft by a pin 97 in its hub portion and the other end of the cam lever carries on a screw pin 98 threaded into one face thereof, a cam roll 99 adapted to engage the periphery of the cam. Midway its two ends, the cam lever is rockably mounted on the forward end of a stud shaft 100 and held thereon by a headed screw 101 threaded into the end of the shaft which is supported in the parts 102 and 103 of the frame. When the machine is at its initial starting point, the presser foot should be in a raised position and the cam is provided with a peripheral projection 104 for throwing the inner end of the cam lever downwardly to raise the presser foot bar. The starting of the machine carries this projection out of engagement with the cam roll and the spring 89 then forces the presser foot bar downwardly where it remains until one operation is completed and the projection again engages the cam roll to raise the presser foot bar. In the interim the cam roll is spaced away from the periphery of the cam to permit free vertical adjustment of the block 91 to take care of varying thicknesses of work.

The needles

The eye needle 71 is of usual construction but the hooked needle 72 (Fig. 23) is of an improved construction having the point of its barb bent inwardly to eliminate, on the downward movement of the needle, the possibility of the barb catching in the strands of woven or knitted material and tearing or severing the same. By turning the point of the barb slightly inwardly the hooked needle will pass through even the lightest of material without damaging it. The two needles are set upright in the forwardly projecting portion of a carrier block 110 and are secured therein by set screws 111 and 112 (Fig. 3). The carrier block is mounted for vertical reciprocation in the front face of the housing 61 between a fixed part 115 of that face and a plate 116 fastened to the housing by screws 117. These parts serve as guides for the carrier, the side edges of the latter being grooved to receive the suitably shaped edges of the former. The removal of the plate 116 permits the substitution of another carrier block having needles with different spacing to vary the length of stitch made by the machine when such variation is desired.

The carrier block is reciprocated to impart the necessary vertical movements to the needles by means of a rock shaft 120 oscillated by a cam lever 121 actuated by a cam 122 on the main shaft (Fig. 7). The rock shaft is rotatably mounted in the end of the lower arm and in a bracket 123 integral with the frame. On the rear end of the rock shaft is mounted a short arm 124 having its two ends each in the form of a split collar, one of which embraces the shaft, on which it is tightened by a screw 125, and the other embraces a headed pin 126 on which it is secured by a screw 127. The pin pivotally connects the arm to a link 129 which at its upper end is pivotally connected by a pin 130 to the split end of the lever 121 which at its other end is pivotally mounted on a stud shaft 132 set in suitable bearings 133 and 134 formed in the body portion of the frame. The cam 122, fastened to the main shaft by a screw 135 through its hub portion 136 (Fig. 1), has an endless cam path 137 formed in its forward face in which cam path travels a cam roll 138 rotatably mounted on a pin 139 fixed laterally in and adjacent the free end of the arm 121.

On the forward end of the rock shaft 120 is fastened a short arm 140 extending laterally, which arm has a yoked end which embraces loosely a square block 141 mounted loosely on a pin 142 threaded into the back face of the carrier block. As the rock shaft oscillates the arm is turned to raise and lower the needle carrier, the block sliding in the yoked end of the arm. The cam 122 is shown in Fig. 7 in its normal position with the machine at rest but ready to be started in operation and the amount of rocking movement imparted to the rock shaft, and consequently the length of the upward and downward movements of the needle carrier, depends upon the up and down movements of the cam roll 138 which is positioned just below the main shaft. When the machine starts the portion 144 of the cam grove throws the cam roll away from the center of the cam and raises the needles through the work. The portion 145 holds the needles practically stationary; 146 permits a slight dip of the needles to form a primary loop; 147 drops the needles below the work and the remaining portion of the cam groove raises and lowers the needles the necessary distance in completing the knotted stitch.

*The upper looper*

The upper looper 73, comprising a shank having one end turned laterally and provided with a hooked nose, (Fig. 24) is set radially in the forward end of a stud shaft 150 and is held therein by a set screw 151 in the end of said shaft with its shank depending therefrom and its lower end turned obliquely at an angle of approximately 45 degrees. The shaft is mounted for rocking movement in suitable bearings in depending extensions 152 and 153 on the upper arm. When the machine is at rest, the looper is in a forward position to the left of the needles (Fig. 3) ready to be swung to the right and to pass through the loop on the eye needle to carry said loop to a position to be taken off and thrown over the hooked needle by the take-off member.

For imparting the necessary swinging movement to the upper looper at the appropriate time, the stud shaft is rocked by a cam lever 155 actuated by a cam 156 on the main shaft (Fig. 9). Midway its two ends, the cam lever is provided with a bored hub portion to facilitate its mounting on the stud shaft 100 and mounted on a screw pin 157 threaded into the rear face of the upper end of the cam lever is a cam roll 158 which is adapted to engage a cam path on the periphery of the cam 156. The cam roll is held in tight engagement with the periphery of the cam by a spring 160 under tension fastened at its lower end to a laterally extending arm 161 formed on the hub portion of the cam lever and at its upper end to a pin 162 set in the top 29 of the frame. The lower end of the cam lever is in the form of a yoke within which is slidably mounted a square block 163 and offside said yoked end and adjacent thereto is a short arm 164 having a split collar portion by means of which it is fastened by a screw 165 to the stud shaft 150. The free end of this arm is in the form of a yoke within which is slidably mounted a square block 166 and these two blocks 163 and 166 are held in alignment by a screw 167 passing through the centers of both blocks, the two blocks being separated by a washer 168.

The rotation of the cam 156 rocks the cam lever and the stud shaft 150 thereby imparting a swinging movement to the upper looper in a path perpendicular to the longitudinal axis of the machine and behind the needles. In Fig. 9, the periphery of the cam 156 is shown at 170 as being indented toward the main shaft and it is this portion of the cam path which effects the operations of the upper looper shortly after the machine is started in operation and after this backward and forward movement is accomplished, the upper looper then remains quiescent.

*The take-off looper*

The take-off looper 74 is a depending member having its lower end flattened on the sides with a recessed forward edge for engaging the thread (Fig. 25) and its upper end turned laterally and inserted in a transverse bore in the lower end of a take-off bar 172 loosely mounted in bearings 85 and 86 on the end of the upper arm. The upper end of said bar is threaded to receive nuts 174 and a fibre washer 175, which nuts are adjustable to limit the downward movement of the bar, (Fig. 3).

The normal position of the take-off looper is raised to permit the upper looper to swing laterally to engage the primary loop and carry it laterally behind the hooked needle, the depending shank of the take-off looper being normally in advance of and on one side of the shank of the upper looper. For moving the take-off bar downwardly and for swinging the take-off looper on the longitudinal axis of the bar as a center, the following means is provided.

A sleeved cam 180 is mounted upon the take-off bar and is provided adjacent its top with a curved cam edge 181, the upper portion of which is a portion of a circle which normally is engaged by a cam roll 183 carried on a pin 184 set in the end of a short arm 185 pivotally mounted on a screw pin 186 threaded into the end of the upper arm and is held thereon by a nut 187. The sleeve is fastened to the take-off bar by a set screw 188 and a spring 190 under tension is attached at one end to said set screw and at the other end to the screw pin 186 in the end of the arm to hold the cam against the roll.

For raising and lowering the take-off bar, the arm is provided with an inner cam roll 191 on a pin 192, which roll engages the edge of a cam 193 formed on the front face of the presser foot cam. This cam has a high point 195 (Fig. 3) which engages the cam roll 191 and forces the take-off bar downwardly until the fibre washer engages the top of the bearing when further downward movement of the bar is prevented. The continued movement of the cam then forces the arm 185 downwardly which turns the sleeved cam 180 to turn the bar and take-off looper to swing the looper forwardly toward the operator and to lay the primary loop of thread around and into the hooked needle. This movement is sufficient to hold the bight of the thread under a slight tension in the hooked needle so that when that member descends, it carries the primary loop downwardly with it and off the take-off looper. At this time, the high point 195 in the cam has been reached and a further revolution of the main shaft permits the spring to turn the cam back to initial and the bar to a raised position.

The lower looper

The lower looper 75 has a laterally curved upper end provided with a hooked nose and a restricted neck portion back of the nose (Fig. 26) and its shank is radially mounted in a bore in the forward end of a looper rock shaft 202 rotatably journalled in the end of the lower arm and in the bracket 123, with its rear end projecting beyond said bracket. This shaft has two movements, a longitudinal and a rocking movement for imparting a diagonal movement to the lower looper when necessary.

To rock the shaft 202 to swing the lower looper forward and back, a cam 205 (Fig. 5) is mounted midway on the main shaft, said cam having a cam groove 206 in its front face in which rides a roll 207 loosely mounted on a pin 208 set in an arm 209 adjacent the free end thereof. At its other end this arm is mounted on the stud shaft 132 in the body portion of the frame so that the rotation of the cam imparts an up and down movement to the arm. A short arm 210 having a split collar portion to embrace the shaft 202 is fastened thereto by a screw 211 and the free end of this arm is connected to the free end of the arm 209 by a rod 213 carrying end members 214 and 215 which are connected to the arms respectively by pins 216. By providing the two ends of the rod with right and left-hand threads respectively, the connection between the two arms may be adjusted as to length by turning the rod.

For moving the lower looper shaft 202 longitudinally at the proper times, I employ a cam-lever 220 carrying a cam roll 221 at its upper end which rides upon the margin of the rear face of a circular cam 222. The cam lever is arranged vertically and provided with a hub portion 223 approximately midway its ends whereby it is loosely mounted on a stud 224 threaded into a round projecting boss 225 on the inner face of the frame body portion (Fig. 4). The stud has an integral head 226 to hold the cam lever thereon and a projecting pin portion 227 to serve a purpose hereinafter explained.

On the rear end of the lower looper shaft is threaded a nut 230 having an annular groove 231 into which projects a flat tongue 232 formed on the turned lower end of the cam lever 220. A helical spring 234 is mounted on the looper shaft between the nut 230 and the bracket 123 and being under compression at all times forces the looper shaft rearwardly and holds the cam roll in engagement with the face of the cam.

The cam 222 and its associated mechanisms for moving the lower looper shaft longitudinally is one of the most important features of my invention because it enables the lower looper in its various movements to be timed to the finest degree in relation to the movements of the gripper and the needles and to enable the looper to pass around back of the needles to seize the thread without interfering with the needles. The space in which the lower looper operates is very restricted and its various movements must not only be timed with great accuracy but the paths of the movements must be positioned with equal accuracy. To accomplish this end, the cam surfaces on the cam 222 which control the paths of movement and the timing of the lower looper are adjustable circumferentially of the cam in relation to each other and to the other operating parts.

For this purpose, the cam 222 is cut out circumferentially to form a relatively thin circular flange 240 (Figs. 18 and 19) having an interior circular countersunk portion 241 which serves as a circular guiding channel and separate members having cam surfaces of proper configuration are mounted on said flange. There are three of these members 242, 243 and 244 (Figs. 20–21), each having on its back face a projecting portion 246 fitting within the guiding channel 241. Each cam member is fastened to the operative face of the cam by a headed bolt 247, the threaded shank of which passes through a circumferential slot 249 in the flange into said member. These slots permit the cam members to be adjusted circumferentially of the cam and in relation to each other. The cam roll 221 is relatively small to secure sensitive reactions from the cam surfaces.

Between the cam members are depressed surfaces 252, 253 and 254 and when the cam roll is in engagement with any one of these surfaces the looper shaft is retracted. The cam surfaces throw the shaft forwardly. When this movement is synchronized with the rocking movement of the shaft the resultant path of movement of the lower looper may be diagonal, curved or angular. When the machine is at the starting point, the cam roll is approximately at the point 256 on cam 244 (Figs. 18 and 22). At point 257 on cam 242, the looper is being turned to hook the thread to pull the supplemental loop through the primary loop and to get the looper around the needles, the looper shaft is suddenly retracted and then moved forwardly at point 258 to bring the hooked nose of the looper around the thread to catch it. The foregoing will illustrate the operation of the cam 222 and its effect upon the movements of the lower looper.

The gripper

The gripper 76 is provided for holding the free end of the thread in the first instance but it performs various other functions during the progress of the stitch, such as giving more thread by turning towards the needles and drawing up the thread to tighten the knot by turning away from the needles and finally gripping the supply stretch of the thread to be in position to start another stitch with the free end of the thread gripped.

The gripper is made up of two jaws, an upper jaw 270 and a lower jaw designated as 76 having a hooked nose which is offset and lies over and away from the nose of the upper jaw when the jaws are closed. The upper jaw is pivoted on a screw stud 271 set in the lower jaw which is provided with a split collar end whereby it is fastened by a screw 273 upon a hollow shaft 274 rotatably journalled in brackets 275 and 276 on the lower arm of the machine (Figs. 3, 10 and 11).

Within the hollow shaft is mounted a solid shaft 280 carrying, fastened by a screw 281 to its forward end, a split collar 282. On the rearward face of the split collar is a pin 283 which projects into a straight slot 284 in the upper jaw of the gripper. The two jaws of the gripper are, in effect, mounted on the hollow shaft but the upper jaw is controlled through the pin and slot by the solid shaft so that to get the opening and closing movements of the gripper, it is necessary to secure a relative rotary movement between the solid shaft and the hollow shaft.

Normally, the hollow and solid shafts are in such rotary relation that the jaws are closed and these two shafts are rocked together for performing various functions of the gripper while the jaws are in closed position. Means is provided for rocking the two shafts in unison from a cam on the main shaft with means for rotating the solid shaft in relation to the hollow shaft in order to open and close the jaws and one form of these means comprises the following.

Fastened to the rear end of the hollow shaft 274 by a screw 286 is a gear segment arm 287 which meshes with a gear segment plate 288 of general triangular form mounted at its apex on a headed stud 289 in an upright bearing 290 formed on the bracket 275. The inner end of the segment plate is bifurcated or yoked and to this end is pivotally connected by a screw pin 292 and nut 293 a link 294. A washer 295 overlapping the edges of the slot is interposed between the head of the screw and the plate. The upper end of the link is pivotally connected by a headed pin 297 to the outer end of an arm 300 pivotally mounted at its other end on the stud shaft 132. The arm carries on its rear face a cam roll 301 riding in a cam groove 302 formed in the front face of a circular cam 304, the rotation of this cam moving the arm and link up and down to turn the segment plate on its pivot and the segment arm to rotate the hollow shaft.

The rear end of the solid shaft projects through the segment arm and to this end is fastened a gear segment 306 meshing with a gear segment 307 formed on the upper side of an arm 308 pivotally mounted on a pin 309 set in the lower end of the segment arm 287. The outer free end of the arm 308 carries offset on a screw pin 312 a cam roll 314 adapted to engage cams for turning the solid shaft in rotary relation to the hollow shaft through the segments 307 and 306.

In position to be engaged by the cam roll 314 are two upright cams 316 and 317 in flat engagement with each other, the cam edges, however, being of different curvature. A wire spring 320 interposed between the segment arm 287 and the arm 308 forces the latter outwardly and holds the cam roll in engagement with the cam edges. One end of the spring is coiled around the screw 286 and the other end bears against the screw 312. The former of said cams is designed to hold the cam roll and arm 308 upwardly to prevent any relative rotary movement between the closed and solid shafts and to maintain the jaws in closed position and the second cam is designed to permit the cam roll and the free end of the arm to drop to turn the solid shaft in relation to the hollow shaft to open the jaws of the gripper. In the beginning of the movements which make and complete a knotted stitch, the cam roll 314 engages the first or rear cam and the jaws are kept closed. When the gripper is near the conclusion of the stitch operation, it is thrown over to grip the supply stretch of thread in order to tighten the knot finally and to retain the supply end of the thread in the jaw for the next operation. The gripper mechanism including the hollow and solid shafts are moved a slight distance longitudinally by means to be hereinafter described so that the cam roll slips off the first or rear cam and onto the second or front cam, this occurring at the top portions of the cams. The curvature of the second cam is on a smaller radius so that the cam roll is permitted to drop which turns the solid shaft in relation to the hollow shaft through the instrumentality of the gear segments 307 and 306 and opens the jaws for an instant and then closes them upon the supply stretch of thread when the roll reaches the bottom of the second cam and rides upon a raised portion of the same level as the bottom of of the first cam, after which the gripper mechanism is then thrown rearwardly to bring the cam roll in engagement with the bottom of the first cam edge ready for the next operation.

For moving the gripper mechanism forwardly longitudinally in order to move the cam roll 314 off the first cam and onto the second cam, a cam operated cam lever 324 is provided with a hub portion 325 midway its ends whereby it is pivotally mounted on a headed screw stud 326 threaded into the depending extension 152 of the frame. The upper end of the cam lever carries, on a pin 327, an offset cam roll 329 adapted to ride on the margin of the rear face of the cam 156 which rocks the upper looper (Fig. 6).

The lower end of the cam lever carries a transverse pin 330 having a vertical tongue formed on its inner end which lies in an annular groove 332 in a nut 334 threaded on a thickened portion of the hollow gripper shaft. The movement of the lower end of the cam lever thereby moves the gripper mechanism longitudinally forwardly and rearwardly. A helical spring 336 mounted on the hollow shaft under compression tends to hold the gripper mechanism in a rearward position.

The cam 316 is fixed on the upper edge of the outwardly extending portion of a right-angled web or bracket 340 fastened to the frame by a screw 341 and the cam 317 is pivotally mounted at its lower inwardly extending end on a pin 343 screwed into said web, said cam 317 being pivotally movable on said pin and being in flatwise engagement with said cam 316. The cam 317 is made movable so that it may be utilized for operating a safety device to prevent the machine being started by accident or otherwise to avoid accidents, which device will be hereinafter described.

The thread control devices

It will conduce to a clearer understanding of the general operation of the machine if the take-up and tightening devices are described in their logical sequence in connection with the other devices for controlling the thread as it travels from the spool or other source of supply through the machine to the operating instrumentalities and for that reason these devices will be described along the path of travel of the thread. The thread 350 used in the machine may be drawn from a spool 351 or from any other suitable source of supply. When a spool is used, it may set on a support 352 and the thread passed upwardly through a hole 353 in an arm 354 fixed in adjusted vertical position by a screw 355 on a standard 356 set in the spool support, the thread being drawn upwardly off the spool free of tension.

The thread straightener

The thread is wound on the spool by left hand turns and when it is drawn therefrom there is a tendency for the thread to kink up or form twists which interferes with the travel and use of the thread in the machine. This tendency becomes more pronounced in the inner turns of thread on the spool since those turns have been more or less under the pressure of the outer turns for a long time.

To remove this tendency of the thread to twist a thread straightener is provided which operates to straighten the thread by giving it a certain number of right hand turns in its forward travel to neutralize the effect of the left hand turns to which the thread has been subjected in the spool windings.

One form of means for attaining this result comprises an elongated wire member 360 parallel with the longitudinal axis of the machine and the travel of the thread and fixed in said position by having its rear end coiled about and held by a screw 361 set in the edge of the rear portion of the frame. From the screw the wire extends forwardly in unsupported position. A loop 362 is formed in the wire adjacent its rear end which loop is an outside loop, that is, that portion of the wire forward the loop being on the outside at the loop which prevents the thread from catching in the loop which would happen if the loop were reversed. The thread is led downwardly from the arm 354 through the loop 362 and is then given one or more right hand turns around the wire 360, which turns are held on the wire by the upturned forward end 364 thereof.

This device in addition to removing the kinks in the thread also serves as a light tension device to prevent the thread loosening up or accumulating in the machine. The number of right hand turns of the thread around the wire may be varied to regulate the tension but as a rule a heavier thread will require fewer turns than a lighter thread.

Holding device

From the wire member, the thread passes in a straight stretch forwardly through a hole in the web 340 and underneath the housing 61 to a take-up spring on the front face of said housing. Underneath the housing, however, is arranged a device for holding the thread just before the knot is finally completed to permit it to be tightened. (Figs. 1 and 3).

Fastened by a screw 368 in a recess in the bottom face of the housing 61 is a plate 370 having its forward end turned downwardly at right angles and then rearwardly at right angles. The thread passes through a hole in the turned down edge end close to the plate, and projecting laterally into the space between the reversely turned end and the plate is a pin 372 fixed radially in a small shaft 374 and held by a screw 375. The shaft is rotatably mounted at its two ends in parts of the lower arm, but is adapted to be rocked at the proper time to turn said pin upwardly to hold the thread by pinching it against the lower face of the plate 370.

For rocking the shaft to accomplish this end, a split block 378 is fastened eccentrically to the shaft by a screw 379 and is connected by a link 381 to a short rearwardly extending arm 383 formed on the lower arm of the cam lever 155 (Fig. 9). The upper end of the link is provided with a longitudinal slot 384 through which passes a pin 385 set in the cam lever for connecting the link thereto. The connection between the link and cam lever is a loose one and the holding shaft 374 is rocked only when the cam lever is rocked to engage the upper end of the slot to move the link upwardly. Since the upper looper ceases to operate after the primary loop is drawn down through the work, the upper looper cam 156 is provided with a high portion for moving the cam lever 155 to rock the holding shaft to hold the thread until the stitch is completed. When the link is released it drops by gravity releasing the thread.

Take-up and tightening devices

These two devices should, because of their close cooperative action, be described together. The take-up member is a light resilient coiled wire spring 77 mounted on a screw 391 set in the front face of the housing 61 and having a small loop 392 in its free end. The tightening member is a stiffer coiled spring 78 having one end fastened in the bottom face of the needle carrier by a screw 395. This spring extends forwardly with its free end in the form of a loop 397.

The thread passes from the holding member through the coil of the tightening spring, then through the end loop of the take-up spring, thence through the end loop of the tightening spring and upwardly, to the eye needle. The take-up spring is fixed in position but the tightening spring travels vertically with the needle carrier and is adjustable vertically therein to regulate the tightness of the knot tied by the machine. To increase the tightness, it is adjusted downwardly from the carrier. Adjustment is also required for substantial variations in the thickness of the work in which the knot is formed.

These two springs do not operate until after the holding device has shut off a further supply of thread. From this point, the knot must be completed with the supply of thread forward of the holding device and the thread must be released as required but kept under tension at all times and must not be released until the knot is finally tightened. The holding device is operated after the primary loop has been drawn down through the work and just before the lower looper engages the thread to form the supplemental loop.

The take-up spring forms an angle in the thread and when more thread is required this spring bends to reduce the angle thereby releasing thread but maintaining it under tension. The needle carrier also cooperates during the final steps to release the thread when required by the lower looper and for taking it up when necessary by either an up or a down movement.

The work supporting member

For preventing the work being drawn down into the needle recess in the work plate when the primary loop is tightened by the downward travel of the needles, a supporting member carried by the presser foot is thrown forward above the work when the presser foot is dropped and the primary loop is laid over this member, but before the knotted stitch is finally tightened, this member is withdrawn.

The supporting member is in the form of a stiff wire 80 fastened at its rear end in the bottom face of a block 402 slidably mounted on a pin 403 which pin is mounted in a smooth bore in the presser foot arm, its end being threaded into the presser foot (Figs. 13–15). Back of the presser foot arm the pin is provided with an annular shoulder portion 405 adapted to engage the back face of that arm when the pin is screwed into the presser foot. The supporting member is bent downwardly and then horizontally so that its free end lies in a slot in the bottom face of the presser foot with the end of the supporting member lying just rearwardly of the needle recess or opening in the presser foot. The block 402 is also provided with a forwardly extending guiding pin 407 extending into a bore in the presser foot arm. Backing up the block on the pin is a helical spring 409, the pressure of which may be adjusted by a nut 410 threaded on the rear end of the pin.

For throwing the block and supporting member forwardly and rearwardly, the following means is provided. A split block 412 is secured by a screw 413 to the lower end of a vertical rod 415 slidably mounted in a bracket 417 and having a squared upper end 418 which is clamped in the split end 420 of the block 91 in the presser foot rod and fastened therein by a screw 422 so that the split block 412 moves up and down with the presser foot rod. The split block 412 has rotatably mounted in its forward end a small shaft 425 to the inner end of which is fastened a short arm 426 carrying a pin 427 which extends into the recessed side face of the block 402. The outer end of said shaft 425 has clamped thereto by means of a screw 428 an upwardly extending short arm 429 which is pivotally connected by a screw 430 to a link 431. At its other end, this link is pivotally connected by a screw 432 to a forwardly extending arm 434 integral with the gripper cam lever 324.

The arm 429 and link 431 are always in angular relation and the various parts are so arranged that the supporting member is moved forward when the angle between the link and the arm is increased and is retracted when that angle is decreased. The dropping of the presser foot on the starting of the machine is utilized for dropping the split block to increase the angle between the link and arm to throw the supporting member forward but since the presser foot is not raised until the knot is finished and it is desirable to have the supporting member pulled out of the knot before the primary loop is tightened, I utilize the movement of the cam lever for throwing the gripper mechanism forward in order to retract the supporting member by diminishing the angle between said link and said arm. This is a convenient way of accomplishing this result because the two movements occur at the same time.

Although the supporting member is shown in wire form, it will, of course, be understood that if the machine is adjusted for a longer stitch or knot, it would be desirable to use a supporting member of a width corresponding to the length of the stitch or knot.

The cutting mechanism

The cutting mechanism comprises an elongated plate 440 having its forward end formed for cutting and being adapted to be moved longitudinally for cutting by a cam mechanism comprising a cam lever 441 connected to the rear end of said plate and carrying a cam roll 442 adapted to be actuated by cam surfaces on the rear face of the lower looper shaft cam 205 (Fig. 6). The cutting plate 440 is mounted in a recess formed in the lower face of the work plate and longitudinally parallel with the longitudinal axis of the machine (Fig. 13). The cutting plate is thus held between the work plate and the top portion of the housing 61 which also supports the work plate. The cutting plate is provided with two vertical cutting edges 446 and 447 formed on the two sides of the plate by cutting away the central portion of the forward end of the plate on approximately a semi-circle. A central open slot 449 extending rearwardly from the center of the inwardly curved forward end of the plate permits the cutting edges to be bent outwardly when necessary to make close engagement with the sides of the recess in the lower face of the work plate in case any material is removed from the outer sides of the plate in sharpening the cutting edges.

The cam lever 441 is provided with a hub portion 450 nearer its upper end whereby it is mounted on a bolt 451 threaded into an inwardly projecting boss 453 on the inner face of the body portion of the frame and the lower end of the cam lever is pivotally connected to a link 455 by a screw pin 456. The forward end of said link has attached thereto by a screw 458 a right-angled block 460 having a recess in its upper face for receiving the rear end of the cutting blade which may be fastened to said block in adjusted position by a screw 462 passing through an open slot 463 in the rear end of said plate. The rear end of said recess in the top face of the block may be closed if desired to serve as an abutment for the rear end of the plate. In the upper end of the cam lever is threaded a screw 465 for carrying a cam roll 442 in position to engage the cam surfaces 468 formed upon the rear face of the cam 205. These cam surfaces are so positioned on the cam that just before the machine is stopped and the presser foot raised, the cutting plate is thrown forward to cut. In this operation, it is essential that the supply thread from the gripper to the knot be cut first because that thread is under such a tension that if the free end of the thread which extends from the knot and is held gripped between the lower face of the work-plate and the head of the lower looper should be cut first, the action of the gripper on the supply stretch would loosen the knot. To cut the thread between the knot and the gripper first, a projection 469 (Fig. 28) is formed on the under face of the work plate adjacent the left hand edge of the needle opening, which projection extends slightly further rearwardly than a similar projection 470 on said face adjacent the right edge of the needle opening. Both projections have perpendicular rear walls slightly inclined toward the front in a direction away from the needle opening and when the stitch is finally completed and the cutting plate is ready to advance, the thread from the gripper to the knot lies behind the projection 469 in engagement with the rear face thereof and the thread from the knot to the looper lies in a similar position back of the projection 470. In advancing the cutting edge 446 engages the gripper thread and shears it off thereby releasing the tension on the knot and the cutting of the free looper end of the thread immediately follows so that the stitch is not disturbed. This cutting is accomplished by a shearing action because the cutting edges on the plate are inclined forwardly in an upward direction.

The safety device

Since the machine is adapted to be started by pressure on a foot treadle, it is desirable in order to prevent accidents to provide a safety device adapted to be thrown into a position for preventing operation whenever the operator is obliged to thread the needle or to do any work around the operating instrumentalities. An accidental or inadvertent pressure on the foot treadle, while operator is threading the needle, for instance, might start the machine and inflict an injury to the hands.

The safety device comprises a member adapted to be turned by a hand operated lever under the bottom end of the clutch locking pin for preventing the release of the clutch. This member is in the form of a bar 472 rotatably mounted in bearings 474 and 475 formed (Fig. 2) on the outer face of the body portion adjacent the base and has its rear end turned upwardly to nearly engage the lower end of the clutch locking pin when it is in operative position for locking that pin against downward movement to release the clutch. For throwing the safety device into and out of operative position, the forward end of the bar 472 has fastened thereto a depending arm 477 having its upper end in the form of a split collar adapted to be clamped around the end of the bar by a screw 478, which arm is pivotally connected by a screw 480 to a link 481 passing through an opening 482 in the frame and pivotally connected at its other end to a screw pin 484 threaded into one arm of a bell-crank lever 486 pivotally mounted on a pin 487 in the bracket 340. The upper arm of the bell-crank lever is pivotally connected to the pivoted cam 317 by a link 488 so that when the bell-crank lever is turned downwardly to throw in the safety device, the cam 317 is drawn downwardly which opens the jaws of the gripper to permit the operator to thread the gripper preparatory to starting the machine. Unless the operator throws in the safety device, she cannot thread the gripper. A helical spring 490 fastened at one end to a pin 491 set in the upper arm of the bell-crank lever and at its other end to a pin 492 in the bracket 340 holds the bell crank in whatever position it is moved by the operator.

The operation of the machine

The operation of the machine will be apparent from the foregoing description. In the drawings, the various parts of the machine have been shown in normal position with the clutch thrown out of engagement with the idler pulley. The machine is, however, shown as threaded and ready to start as soon as the treadle is depressed. So long as the treadle is depressed, the machine continues to operate, making a series of completed knotted stitches each independent of the other. The machine is shown without feeding means, the work being fed by hand and when the treadle is released the machine completes that particular stitch and stops in the position shown in the drawings.

The work may be fed by hand in two directions, first, transversely the machine to lay a linear series of independent knotted stitches or longitudinally the machine to lay a series of independent stitches, one behind the other, in parallelism. I have not shown any feeding means in the drawings because the provision of such means for feeding the work either transversely the machine or longitudinally thereof would be apparent to one skilled in the art.

The machine of my invention is capable of a great variety of uses and it may, for instance, be employed for stitching together leather parts either in shoes, sporting goods or other articles of manufacture which are subjected to strain and long use and in which a series of independent stitches which could not be ripped out would be desirable. At the present time, it is customary to stitch the leather parts of such goods together by the use of sewing machines employing a chain stitch but the disadvantage of this kind of stitching is that the threads of the stitches are continuous and if one breaks under strains the stitching unravels. By the use of my machine, however, each stitch is an independent unit and the breaking of one or more of the stitches does not effect the remaining stitches. Furthermore, the chain stitch is a single thread stitch in part, whereas my stitch is made up of two threads in every portion which makes it a very much stronger stitch and one that will stand a very heavy strain before breaking.

Furthermore, the machine of my invention is capable of use for sewing on flat buttons by providing suitable means which would be apparent to one skilled in the art for locating the eyes of the buttons so that the needles will pass through the eyes during the operation of the machine. By adding a suitable raceway to the machine, which would be a simple matter and apparent to anyone skilled in the art, the machine may be used for attaching shank buttons to cloth, leather or other flexible material. I have not shown a raceway in the drawings because this is merely one well known appliance which may be added to the machine for adapting it to a particular use.

The foregoing are merely some of the uses of the machine since there are many others to which it is adapted.

It is to be understood that my invention is not to be limited to the specific form thereof shown and described herein since it is capable of various other embodiments all within the scope of the following claims.

What I claim is:

1. In a machine of the character described, the combination of a work-support provided with a longitudinal recess in its bottom face, means for passing a loop of thread comprising a pair of stretches in reverse directions through the material for forming a primary loop, means for passing one of said stretches of said thread through said primary loop as a supplemental loop, means for passing the other of the stretches of said thread through said supplemental loop, means for drawing the thread taut in order to form a knot comprising the bights of said loops and said other of said stretches in knotted relation and means for severing the supply thread close to the knotted stitch, said means being operative to sever the supply thread at one side of the knotted stitch, and thereafter to sever the free end of the thread at the other side of the knotted stitch, said severing means comprising a cutter slidably arranged in the bottom recess in the work support, and means for reciprocating said cutter, said cutter having cutting edges engageable respectively with the thread at the opposite sides of the knotted stitch, and means cooperable successively, first with one cutting edge of the cutter and then with the other to sever the thread at opposite sides of the knotted stitch.

2. In a machine of the character described, the combination of a work support provided with a longitudinal recess in its bottom face means for passing a loop of thread comprising a pair of stretches in reverse directions through the material for forming a primary loop, said means comprising a pair of needles, one being an eye needle and the other a hook needle and means for throwing a loop from said eye needle over and on said hook needle, means for passing one of said stretches of said thread through said primary loop as a supplemental loop, means for passing the other of the stretches of said thread through said supplemental loop, means for drawing the thread taut in order to form a knot comprising the bights of said loops and said other of said stretches in knotted relation and means for severing the supply thread close to the knotted stitch, said means being operative to sever the supply thread at one side of the knotted stitch and thereafter to sever the free end of the thread at the other side of the stitch, said severing means comprising a slide member arranged in the recess in the bottom of the work support, means for moving the slide member, and two pairs of shear devices each comprising a movable blade actuated by said slide member, one pair of said shear members being arranged to engage and cut the thread prior to the cutting action of the other pair.

3. In a machine of the character described, the combination of means for passing a loop of thread comprising a pair of stretches in reverse directions through the material for forming a primary loop, said means comprising a pair of needles, one being an eye needle and the other a hook needle, a looper for drawing a loop from said eye needle back of said hook needle and a take-off member, a vertical shaft carrying said member, said shaft being mounted for longitudinal and rotary movement, cam-operated means for imparting longitudinal and rotary movement to said shaft for removing said loop from said looper into said hook needle, means for passing one of said stretches of said thread through said primary loop as a supplemental loop, means for passing the other of the stretches of said thread through said supplemental loop and means for drawing the thread taut in order to form a knot comprising the bights of said loops and said other of said stretches in knotted relation.

4. In a machine of the character described, the combination of a work support provided with a longitudinal recess in its bottom face means for passing a loop of thread comprising a pair of stretches in reverse directions through the material for forming a primary loop, a looper for passing one of said stretches of said thread through said primary loop as a supplemental loop, means for passing the other of the stretches of said thread through said supplemental loop, means for drawing the thread taut in order to form a knot comprising the bights of said loops and said other of said stretches in knotted relation and means for severing the thread, said means being operative to cut the supply thread at one side of the knotted stitch and thereafter to cut the free end of the thread at the other side of the stitch, said cutting means comprising a pair of fixed blade members secured to and projecting downwardly from the under side of the work support, one member of the pair having its cutting edge disposed in a plane to the rear of the cutting edge of the other, and a slide member sliding in the recess in the under side of the work support, said slide member having parts cooperable with said blades respectively to sever the thread successively at opposite sides of the stitch.

5. In a machine of the character described, the combination of a work support provided with a longitudinal recess in its bottom face, means for passing a loop of thread comprising a pair of stretches in reverse directions through the work for forming a primary loop, a looper for passing one of said stretches of said thread through said primary loop as a supplemental loop and for passing the other of the stretches of said thread through the supplemental loop, means for drawing the thread taut in order to form a knot comprising the bights of said loop and said other of said stretches in knotted relation and a cutting mechanism for severing the threads close to the knot, said means being operative to cut the supply thread at one side of the knotted stitch and thereafter to cut the free end of the thread at the other side of the stitch, said cutting means comprising a pair of projections at the under side of the work support, said projections having fixed shear edges, one of said edges being in a plane rearward of the other, and a slide member sliding in the recess in the work support and having a pair of shear blades cooperable respectively with the shear edges of the respective projections.

6. In a machine for forming a knotted stitch, the combination of a work-support, a vertically reciprocating carrier, an eye needle and a hook needle set upright on said carrier, said eye needle being adapted for passing a loop of thread comprising a pair of stretches in one direction through the material and said hook needle being adapted for passing said loop through the material in the reverse direction, an upper looper for carrying said loop of thread from the eye needle back of the hook needle, a take-off looper, a vertical shaft carrying said take-off looper, means for imparting longitudinal and rotary movement to said shaft for laying said loop around the hook needle to be drawn through the material in the reverse direction to form a primary loop, means for passing one of said stretches of said thread through said primary loop as a supplemental loop, means for passing the other of said stretches of said thread through said supplemental loop and means for drawing the thread taut in knotted relation.

7. In a machine for forming a knotted stitch, the combination of a work-support, means for passing a loop of thread comprising a pair of stretches in reverse directions through the material for forming a primary loop, said means comprising a vertically reciprocating needle carrier, two needles set upright in said carrier, one a hook needle and the other an eye needle, an upper looper, and a take-off looper, a vertical shaft carrying said take-off looper, means for imparting longitudinal and rotary movement to said shaft, a lower looper for drawing one of said stretches through said primary loop as a supplemental loop and for drawing the other of said stretches through said supplemental loop and means for drawing the thread taut.

8. In a machine for forming a knotted stitch, the combination of a work-support, an eye needle, a hook needle, an upper looper and a take-off looper, a vertical shaft carrying said take-off looper, a cam for imparting longitudinal and rotary movement to said shaft, all for passing a loop of thread comprising a pair of stretches in reverse directions through the material for forming a primary loop, a lower looper having a hooked nose and a restricted neck for drawing one of said stretches through said primary loop as a supplemental loop and for drawing the other of said stretches through said supplemental loop and means for drawing the thread taut to complete the knotted stitch.

9. In a machine for forming a knotted stitch, the combination of means for passing a loop of thread comprising a pair of stretches in reverse directions through the material for forming a primary loop, said means comprising a reciprocating needle carrier, an eye needle and a hook needle set upright in the carrier, an upper looper, a take-off looper, a vertical shaft carrying said take-off looper, a cam for imparting longitudinal and rotary movement to said shaft, and means for reciprocating said carrier and for causing it to dip at the appropriate moment, a looper for passing one of said stretches of said thread through said primary loop as a supplemental loop, means for passing the other of the stretches of said thread through said supplemental loop, means for controlling the thread and releasing it when necessary and means for drawing the thread taut in order to form a knot comprising the bights of said loops and said other of said stretches in knotted relation.

10. In a machine for forming a knotted stitch, the combination of means for passing a loop of thread comprising a pair of stretches in reverse directions through the material for forming a primary loop, said means comprising a reciprocating needle carrier, an eye needle and a hook needle set upright in the carrier, an upper looper, a take-off looper, a vertical shaft carrying said take-off looper, a cam for imparting longitudinal and rotary movement to said shaft and means for reciprocating said carrier and for causing it to dip at the appropriate moment, a looper for passing one of said stretches of said thread through said primary loop as a supplemental loop, means for passing the other of the stretches of said thread through said supplemental loop, means for controlling the thread and releasing it when necessary, means for drawing the thread taut in order to form a knot comprising the bights of said loops and said other of said stretches in knotted relation, a cutting plate provided with a pair of separated cutting edges and means for throwing said plate forwardly to cut the threads close to said knot.

11. In a machine for forming a knotted stitch, the combination of a work support provided with a longitudinal recess in its bottom face means for passing a loop of thread comprising a pair of stretches in reverse directions through the material for forming a primary loop, a looper for passing one of said stretches of said thread through said primary loop as a supplemental loop, means for passing the other of the stretches of said thread through said supplemental loop, an automatic take-up for controlling the thread supply and releasing it when necessary, means for drawing the thread taut in order to form a knot, said knot comprising the bights of said loops and said other of said stretches in kotted relation, and means operative to cut the supply thread at one side of the knotted stitch and thereafter to cut the free end of the thread at the other side of the stitch, said cutting means comprising a cutting plate provided with a pair of vertical, separated cutting edges, cam operated means for throwing said plate forwardly to cut the threads close to said knot and a pair of fixed blades cooperating with the respective cutting edges of the plate, one of said fixed blades being arranged to cooperate with its respective cutting edge prior to the cooperation of the other fixed blade with the second cutting edge.

12. In a machine for forming a knotted stitch, the combination of a work-support, a vertically reciprocating needle carrier, an eye needle and a hook needle mounted on said carrier, said eye needle being adapted for passing a loop of thread comprising a pair of stretches through the work and said hook needle being adapted for drawing said loop of thread through the material in a reverse direction to form a primary loop, a looper arranged above the material for passing said loop from said eye needle back of said hook needle, a take-off, a vertical shaft carrying said take-off looper, a cam for imparting longitudinal and rotary movement to said shaft looper for laying said loop around said hook needle before the same is drawn in a reverse direction through the material, a lower looper adapted to pass through said primary loop for drawing one of said stretches of said thread from said eye needle through said primary loop as a supplemental loop and for passing the other of the stretches of said thread through said supplemental loop and means for drawing the thread taut in order to form a knot comprising the bights of said loops and said other of said stretches in knotted relation.

13. In a machine for forming a knotted stitch, the combination of a work-support, a vertically reciprocating needle carrier, an eye needle and a hook needle mounted on said carrier, said eye needle being adapted for passing a loop of thread comprising a pair of stretches through the needle and said hook needle being adapted for drawing said loop of thread through the material in a reverse direction to form a primary loop, a looper arranged above the material for passing said loop from said eye needle back of said hook needle, a take-off looper, a vertical shaft carrying said take-off looper, a cam for imparting longitudinal and rotary movement to said shaft for laying said loop around said hook needle before the same is drawn in a reverse direction through the material, a lower looper adapted to pass through said primary loop for drawing one of said stretches of said thread from said eye needle through said primary loop as a supplemental loop and for passing the other of the stretches of said thread through said supplemental loop and means including a gripper and an automatic spring take-up for drawing the thread taut in order to form a knot comprising the bights of said loops and said other of said stretches in knotted relation.

14. In a machine for forming a knotted stitch, the combination of a hollow shaft, a jaw fixed on one end of said hollow shaft, a second jaw pivotally mounted on said first jaw and cooperating therewith, a solid shaft mounted within said hollow shaft and provided with means for moving said pivoted jaw on its pivot to open said jaws when said solid shaft is rocked in relation to said hollow shaft and means for rocking said solid shaft in relation to said hollow shaft comprising a pair of cams in adjacent flatwise relation having cam edges of different curvature, a cam-controlled arm, a spring for holding said arm in engagement with said cam edges and means for moving said shafts longitudinally in unison to disengage said arm from one of said edges.

15. In a machine for forming a knotted stitch, the combination of a hollow shaft, a jaw fixed on one end thereof, a second jaw pivotally mounted on said first mentioned jaw and cooperating therewith, a solid shaft mounted within said hollow shaft and provided with means for moving said pivoted jaw upon its pivot to open said jaws when said solid shaft is rocked in relation to said hollow shaft and means for controlling said relative rocking movement of said solid shaft comprising a pair of cams in adjacent flatwise relation having cam edges of different curvature, a gear segment secured to said solid shaft, a cam-controlled arm having a gear segment meshing with said first mentioned gear segment, a spring for holding said arm in cam-engaging position and means for moving said shafts longitudinally in unison to disengage said arm from one of said cams.

16. In a machine for forming a knotted stitch, the combination of a hollow shaft, a solid shaft mounted within said hollow shaft, a jaw fixed on one end of said hollow shaft, a second jaw pivotally mounted on said first mentioned jaw, means carried by said solid shaft for moving said pivoted jaw to open and close said jaws when said solid shaft is rocked in relation to said hollow shaft, cam-operated means whereby said two shafts are turned in unison and cam-operated means for changing the relation of said two shafts to each other in order to open and close said jaws, said two cam-operated means including a pair of cams in adjacent flatwise relation having cam edges of different curvature, said last mentioned cam-operated means being within the control of the operator when the machine is at rest for opening and closing said jaws.

17. In a machine of the character described, the combination with means for passing a loop of thread, comprising a pair of stretches in reverse directions through the material for forming a primary loop, means for passing one of said stretches of said thread through said primary loop as a supplemental loop, means for passing the other of the stretches of said thread through said supplemental loop and means for drawing the thread taut in order to form a knot, of a supporting member over which the primary loop is laid, said member being adapted to prevent the work being drawn downwardly during the forming of the knot and means for withdrawing said supporting member before the knot is tightened.

18. In a machine of the character described, the combination with means for passing a loop of thread, comprising a pair of stretches, in reverse directions through the material for forming a primary loop, means for passing one of said stretches of said thread through said primary loop as a supplemental loop, means for passing the other of the stretches of said thread through said supplemental loop and means for drawing the thread taut in order to form a knot, of a supporting member adapted to be thrown forwardly above the work in position to receive the primary loop to prevent the work being drawn downwardly during the formation of the knot, means for throwing said supporting member forwardly when the machine is started and means for withdrawing said supporting member from the knot before it is tightened.

19. In a machine of the character described, the combination of means for passing a loop of thread, comprising a pair of stretches, in reverse directions through the material for forming a primary loop, a lower looper for passing one of said stretches of said thread through said primary loop as a supplemental loop, and for passing the other of said stretches of thread through said supplemental loop, a looper shaft carrying said lower looper, cam operated means for rocking said shaft and a second cam operated means for imparting longitudinal movement to said shaft, said second cam operated means including a cam having a plurality of circumferentially adjustable cam members for timing said longitudinal movement of said looper shaft in relation to its longitudinal movement.

20. In a machine of the character described, combination of means for passing a loop of thread, comprising a pair of stretches, in reverse directions through the material for forming a primary loop, a lower looper for passing one of said stretches of said thread through said primary loop as a supplemental loop, and for passing the other of said stretches of thread through said supplemental loop, a looper shaft carrying said lower looper, cam operated means for rocking said shaft and a second cam operated means for imparting longitudinal movement to said shaft, said second cam operated means including a cam having a plurality of relatively adjustable cam members for timing said longitudinal movement of said looper shaft in relation to its longitudinal movement, a gripper mechanism for tightening said knot and means for severing the threads after said knot is tightened.

21. In a machine of the character described, the combination with means for forming a knotted stitch, of a presser foot having a groove in its bottom face, a work-supporting member carried by said presser foot and slidably mounted in said groove, means for throwing said member forwardly into work-supporting position whenever said presser foot is dropped and means for retracting said member into inoperative position whenever a knotted stitch is formed and before it is tightened.

22. A machine of the character described, a combination with means for forming a knotted stitch, of a presser foot having a groove in its bottom face, a work-supporting member carried by said presser foot and longitudinally movable in said groove, cam-operated means for throwing said member forwardly into work-supporting position whenever said presser foot is dropped and means for retracting said member into inoperative position whenever a knotted stitch has been formed and before it is tightened.

23. In a machine of the class described, the combination with means for forming a knotted stitch, of means for holding the thread to permit the knot to be tightened and comprising a fixed plate having an end hole for guiding the thread across the surface of said plate, a shaft provided with a radial pin and means for rocking said shaft to cause said pin to pinch said thread against the surface of said plate.

WILLIAM F. LAUTENSCHLAGER.